United States Patent
Matthews et al.

(10) Patent No.: US 10,839,162 B2
(45) Date of Patent: Nov. 17, 2020

(54) SERVICE MANAGEMENT CONTROL PLATFORM

(71) Applicant: ROYAL BANK OF CANADA, Montreal (CA)

(72) Inventors: Ryan Matthews, Montreal (CA); Hoda Zare, Montreal (CA)

(73) Assignee: ROYAL BANK OF CANADA, Montreal (CA)

( * ) Notice: Subject to any disclaimer, the term of this patent is extended or adjusted under 35 U.S.C. 154(b) by 145 days.

(21) Appl. No.: 16/112,067

(22) Filed: Aug. 24, 2018

(65) Prior Publication Data
US 2019/0065470 A1 Feb. 28, 2019

Related U.S. Application Data

(60) Provisional application No. 62/550,321, filed on Aug. 25, 2017.

(51) Int. Cl.
| | | |
|---|---|---|
| *G06F 17/27* | (2006.01) | |
| *G10L 15/06* | (2013.01) | |
| *G06F 40/30* | (2020.01) | |
| *G06Q 10/06* | (2012.01) | |
| *G06F 40/284* | (2020.01) | |
| *G06N 20/00* | (2019.01) | |
| *G06N 7/00* | (2006.01) | |
| *G10L 15/07* | (2013.01) | |

(52) U.S. Cl.
CPC ............ *G06F 40/30* (2020.01); *G06F 40/284* (2020.01); *G06N 7/005* (2013.01); *G06N 20/00* (2019.01); *G06Q 10/0635* (2013.01); *G10L 15/075* (2013.01)

(58) Field of Classification Search
None
See application file for complete search history.

(56) References Cited

U.S. PATENT DOCUMENTS

| | | | |
|---|---|---|---|
| 8,812,274 B2 * | 8/2014 | Virkar | G06K 9/6232 703/2 |
| 9,135,292 B1 * | 9/2015 | Tsun | G06F 16/958 |
| 10,318,552 B2 * | 6/2019 | Baughman | G06F 16/00 |
| 2005/0027717 A1 * | 2/2005 | Koudas | G06F 16/3347 |
| 2012/0030206 A1 * | 2/2012 | Shi | G06F 16/353 707/738 |
| 2012/0296637 A1 * | 11/2012 | Smiley | G06K 9/6201 704/9 |
| 2013/0332478 A1 * | 12/2013 | Bornea | G06F 16/211 707/763 |

(Continued)

OTHER PUBLICATIONS

EPO, European extended search report for EP Application No. 18190889.8 dated Oct. 10, 2018.

(Continued)

*Primary Examiner* — Richard Z Zhu
(74) *Attorney, Agent, or Firm* — Norton Rose Fulbright Canada LLP; Maya Medeiros

(57) ABSTRACT

A control platform that involves a natural language engine with a risk-based corpora, a rules engine with feature vectors from labelled change records, and topic model to generate an expected label for an additional change record based on training data generated from the labelled change records and the risk-based corpora.

20 Claims, 20 Drawing Sheets

(56) References Cited

U.S. PATENT DOCUMENTS

| | | | |
|---|---|---|---|
| 2016/0085856 A1* | 3/2016 | Hall | G06F 40/295 |
| | | | 706/46 |
| 2016/0357855 A1* | 12/2016 | Fan | G06F 16/313 |
| 2016/0371618 A1* | 12/2016 | Leidner | G06N 5/025 |
| 2017/0032035 A1 | 2/2017 | Gao et al. | |
| 2018/0096261 A1* | 4/2018 | Chu | G06N 20/00 |
| 2018/0197128 A1* | 7/2018 | Carstens | G06Q 10/0635 |
| 2018/0241881 A1* | 8/2018 | Li | H04M 3/5183 |
| 2018/0357566 A1* | 12/2018 | Liu | G06N 20/00 |

OTHER PUBLICATIONS

Anonymous: "Natural language processing—Wikipedia", Jul. 20, 2017 (Jul. 20, 2017), XP055509683, Retrieved from the Internet: URL:https://en.wikipedia.org/w/index.php?title=Natural_language_processi ng&oldid= 791506250 [retrieved on Sep. 25, 2018].

* cited by examiner

Topic Modeling Algo for Change Management Controls Assurnace. Key control aspects of a change record (CR) are tested through machine learning to ensure they align with policies and standards thereby providing greater assurance of the CMIT Control Framework

[Learn More]

Incident Management Solution

| INCID | App C... | Actual Start | Title | INC Plan | Test R... | Precial... | Pass C... | Fail CRs | Last T... |
|---|---|---|---|---|---|---|---|---|---|
| IM02244549 | SCID | 2018-05-06 5:53 | VSim-Daisy IM | applied.lwb.feed | ✓ | 0.99999999 | IM00241549 | | 2018-06-14 |
| IM02223455 | ETHD | 2018-05-29 11:12 | Symphony Fred | core,component | ✗ | 0.94634997 | IM00246587 | IM00341858 | 2018-06-13 |
| IM02233456 | WRTD | 2018-02-09 8:07 | Requesting nod | node2.restart | ✓ | 0.91567456 | IM00867455 | | 2018-05-19 |
| IM02465873 | TEGO | 2018-07-11 12:10 | Saintbook tap | restart.elect | ✓ | 0.91552393 | IM00654323 | | 2018-08-13 |
| IM02248678 | VX20 | 2018-08-13 7:29 | Ois Lrg 500 MC | incident.statue | ✓ | 0.91443293 | IM00123476 | | 2018-08-13 |
| IM01231459 | UB40 | 2018-02-14 1:31 | Network Science | temporary.fal | ✗ | 0.88816379 | IM00634253 | | 2018-05-15 |
| IM08543749 | SFWO | 2018-05-08 3:12 | CLM_MA_INC | problem.state | ✗ | 0.86334455 | IM00234234 | IM00211440 | 2018-05-13 |
| IM02235759 | SMBO | 2018-02-12 1:22 | Unable to come | component | ✗ | 0.88234555 | IM00343455 | IM02361850 | 2018-05-13 |

FIG. 2

Simplified 2-dimension vector space model, which is used for similarity queries in the algo.

Backout Plan
For all types of charges, a backout ...d (CO-275895/ITCM-2-0). [What's required to pass? >>]

| CRID | ▲ App C... | ▲ BOP Plan | ▲ Test Result | ▲ Precision |
|---|---|---|---|---|
| C00346748 | TFLO | | ✓ | 0.7429599762 |
| C00347766 | VGSO | | ✓ | 0.7590385079 |
| C00348404 | 2R00 | | ✓ | 0.6948458552 |
| C00349481 | VX20 | | ✓ | 0.8419742584 |
| C00349654 | YQKO | | ✓ | 0.6775761247 |

700

Sample output from the web app showing the precision of each expected label

FIG. 7

```
2017-06-28 12:15:... 343 : INFO : Filename: acc_results_IMPL_2017-06-28_121554
2017-06-28 12:15:... 343 : INFO : Finishing sim_queries_()
2017-06-28 12:15:... 343 : INFO : /*********** STEP 3 ******************
2017-06-28 12:15:... 343 : INFO : ****************************************
2017-06-28 12:15:... 343 : INFO : ****************************************
2017-06-28 12:15:... 343 : INFO : ┃ Overall Accuracy: 85.95% ┃**************
2017-06-28 12:15:... 343 : INFO : ****************************************
2017-06-28 12:15:... 345 : INFO : ****************************************
2017-06-28 12:15:... 345 : INFO : Finished Catherine Run at 2017-06-28 12:15:54
2017-06-28 12:15:... 345 : INFO : Elapsed run time: 208.468547 seconds
```

800

Sample output from the algo showing an 85% accuracy result of a recent BOP test.

FIG. 8

Catherine

Topic Modeling Algo for Change Management Controls Assurance. Key control

Backout Plan

| CRID | CR-BOP | CR-IMPL | CR-PIV |
|---|---|---|---|
| C00346748 | | | |
| C00347766 | | | |
| C00348404 | | | |
| C00349481 | | | |
| C00349654 | | | |

Post Implementation Verification Plan

For all types of changes, a PIV verification is completed, aligning to the documen...

What's required to pass? >>

| CRID | CR-BOP | CR-IMPL | CR-PIV |
|---|---|---|---|
| C00346748 | | | |
| C00347766 | | | |
| C00348404 | | | |
| C00349481 | | | |
| C00349654 | | | |

Implementation Plan

For all types of changes, an implementation plan is created, reviewed and ...

What's required to pass? >>

| CRID | App C... ▲ | Title ▲ | Actual Start ▲ | IMPL ▲ |
|---|---|---|---|---|
| | yvko | | | |
| C00313089 | YVKO | | 26/11/2016 1:00PM | |
| C00313659 | YVKO | | 21/11/2016 12:00PM | |
| C00317666 | YVKO | | 05/11/2016 12:00PM | |
| C00318451 | YVKO | | 04/11/2016 4:00PM | |
| C00319342 | YVKO | | 10/11/2016 11:00PM | |

| New | Copy | Save | Save and Close | Edit | Delete |

General Information

▸ Details

▴ Additional Details
▸ Application Impact

▴ Date and Time
▴ Administration
▸ Control Testing

▸ Catherine Results

FIG. 12

SERVICE MANAGEMENT CONTROL PLATFORM

FIELD

The present disclosure generally relates to the field of service management and information technology (IT) control environments.

INTRODUCTION

Technology control failures can have large financial impacts in the market. For example, a typo by an employee can cause IT server outages for web services companies and trigger millions in losses. Deployment of untested software can trigger problems in a production environment. An IT control environment is the set of standards, processes, and structures that provide the basis for carrying out internal control across the organization. Service management refers to approaches to preparing and supporting individuals, teams, and organizations in performing technology services offered to customers (internally or externally facing). Controls assurance programs for service management processes can provide management with assurance that the processes are controlled, monitored and is compliance with good practices and organizational policies. Robust control assurance models can be used to minimize future control issues from occurring by offering proactive guidance or preventing a process from proceeding using leading indicators from learned results.

SUMMARY

In accordance with an aspect, there is provided a control platform with a memory storing instructions to configure a processor to provide: a natural language engine having a risk-based corpora; a rules engine to receive feature vectors generated from labelled change records and update the risk-based corpora, the feature vectors representing topics from the labelled change records; a topic model to generate an expected label for an additional change record based on a similarity query by comparing an additional feature vector generated from the additional change record and the feature vectors generated from the labelled change records, and computing a probabilistic classification for the additional change record, the probabilistic classification corresponding to the expected label, the topic model trained using the risk-based corpora; and a presentation unit to generate an interface for display at an interface application, the interface having visual elements corresponding to the expected label. The additional change record can be an unlabelled change record.

In some embodiments, the topic model computes a semantic similarity score between the additional change record and one or more of the labelled change records.

In some embodiments, the topic model implements supervised learning to compute a semantic similarity rating between the additional change record and one or more of the labelled change records and compares the similarity rating to a similarity threshold.

In some embodiments, the topic model implements supervised learning to compute the probabilistic classification using latent semantic analysis.

In some embodiments, the topic model computes a confidence score for the expected label and compares the confidence score to a confidence threshold, upon determining that the confidence score does not meet the confidence threshold, flagging the additional change record for review, and upon determining that the confidence score meets the confidence threshold, assigning the expected label to the additional change record.

In some embodiments, the topic model receives results of the review for training.

In some embodiments, the natural language engine generates the risk-based corpora by tokenizing and cleansing the labelled change records to generate the feature vectors.

In some embodiments, the platform is configured to convert the labelled change records to feature vectors using unsupervised learning to generate training feature vectors for the corpora and training the topic model.

In some embodiments, the natural language engine converts the labelled change records to feature vectors using a bag-of-words model to represent each of the labelled change records as a multiset of words that retains multiplicity and disregards grammar and word order.

In some embodiments, the natural language engine converts the labelled change records to feature vectors using a term frequency and inverse document frequency real-valued weights model to identify semantic relationships between words of the labelled change records.

In some embodiments, the natural language engine converts the labelled change records to feature vectors using latent semantic analysis to extract conceptual concepts from the labelled change records and patterns in semantic relationships between words of the labelled change records, the natural language engine computing topics for semantic similarity queries.

In some embodiments, the topic model extracts a topic from the additional change record using one or more vector space models, to discover a semantic structure of text of the additional change record.

In some embodiments, the topic model implements a semantic similarity query to compare the additional change record against the labelled change records to determine a similarity score for the additional change record within a similarity threshold.

In some embodiments, the topic model determines that the additional change record is an outlier based on a confidence threshold and triggers the presentation unit to update the interface with outlier data for verification, wherein the results of the verification update or train the topic model.

In some embodiments, the topic model generates the additional feature vectors from the additional change record using a bag-of-words model to represent the additional change record as a multiset of words that retains multiplicity and disregards grammar and word order, converts the multiset of words using a term frequency and inverse document frequency real-valued weights model to identify semantic relationships between features of the additional change record, extracts topics using latent semantic analysis by identifying patterns in the semantic relationships between words of the additional change record.

In some embodiments, semantic similarity score is computed based on a cosine measurement between the additional feature vector and a feature vector of the feature vectors.

In some embodiments, the topic model is trained using one or more model parameters such as number of topics, power iterations, extra sampling, similarity threshold, precision threshold, or a similarity and precision threshold relation.

In some embodiments, the topic model is configured to determine a structure of the additional change record using one or more vector space models.

In some embodiments, the topic model is configured to use one or more vector space models to extract conceptual content and identify patterns in the additional change record for comparison to the risk based corpora.

In some embodiments, the expected label is selected from pass, fail, or suspense.

In some embodiments, the natural language engine generates the feature vectors from the labelled change records, by for each of the labelled change records, using a bag-of-words model to represent the respective labelled change record as a multiset of words that retains multiplicity and disregards grammar and word order, converts the multiset of words using a term frequency and inverse document frequency real-valued weights model to identify semantic relationships between features of the respective labelled change record, extracts topics using latent semantic analysis by identifying patterns in the semantic relationships between words of the respective labeled change record.

In accordance with an aspect, there is provided a control process that can involve using a natural language engine having a risk-based corpora; receiving feature vectors from generated labelled change records and update the risk-based corpora, the feature vectors representing topics from the labelled change records; generating an expected label for an additional change record based on a similarity query by comparing an additional feature vector generated from the additional change record and the feature vectors generated from the labelled change records, and computing a probabilistic classification for the additional change record, the probabilistic classification corresponding to the expected label, the topic model trained using the risk-based corpora; and generating an interface for display at an interface application, the interface having visual elements corresponding to the expected label.

In accordance with an aspect, there is provided a control platform with memory storing instructions to configure a processor to provide: a natural language engine with a risk-based corpora; a rules engine to receive feature vectors from labelled change records; a topic model to generate an expected label for an additional change record based on training data generated from the labelled change records and the risk-based corpora; and a presentation unit to generate an interface for display at an interface application, the interface having visual elements corresponding to the expected label.

In some embodiments, the topic model can extract a topic from the additional change record using latent semantic analysis to discover a semantic structure of text of the additional change record using the training data and supported by the risk-based corpora.

In some embodiments, the topic model can implement a similarity query an additional change record against the labelled change records to determine a probabilistic label for the additional change record within a configurable similarity threshold.

In some embodiments, the topic model can determine that the additional change record is an outlier and triggers the presentation unit to update the interface with outlier data for verification.

In some embodiments, the topic model can convert the labelled change records into feature vectors and the additional change record into additional feature vectors, wherein an aggregate of the feature vectors is used to generate or update the risk-based corpora.

In some embodiments, the topic model can determine a structure of the additional change record using a term frequency and inverse document frequency real-valued weights model.

In some embodiments, the topic model can use latent semantic analysis to extract conceptual content and identify patterns in the additional change record. The patterns and content can be grouped to derive topics that can be used for predictive analytics on the change record.

In accordance with another aspect, there is provided a control process that involves: using a natural language engine to generate a risk-based corpora; receiving feature vectors from labelled change records; generating an expected label for an additional change record based on training data generated from the labelled change records and the risk-based corpora, the expected label indicating a topic for the additional change record; and generating an interface for display at an interface application, the interface having visual elements corresponding to the expected label In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 2 is a diagram showing an example interface according to some embodiments;

FIG. 7 is a diagram of an example interface according to some embodiments;

FIG. 8 is a diagram of example log output for diagnostics and debugging;

FIG. 9 is a diagram of an example interface according to some embodiments; and FIG. 10 is an example interface according to some embodiments.

FIG. 12 demonstrates how the data produced by this embodiment can be visualized in control systems as part of an interface according to some embodiments.

DETAILED DESCRIPTION

Embodiments described herein provide a system that automatically verifies key control aspects of a change record (CR) prior to deployment in the IT environment to ensure they align with the service management policies and standards for an organization that provides greater assurance of an error-free production deployment.

Embodiments described herein provide a system that uses machine learning and natural language processing to provide supervisory assurance and to minimize future control issues. Embodiments described herein provide a system that uses robust control assurance models to minimize future control issues from occurring by offering proactive guidance or preventing a process from proceeding using leading indicators from learned results.

Figure 1:
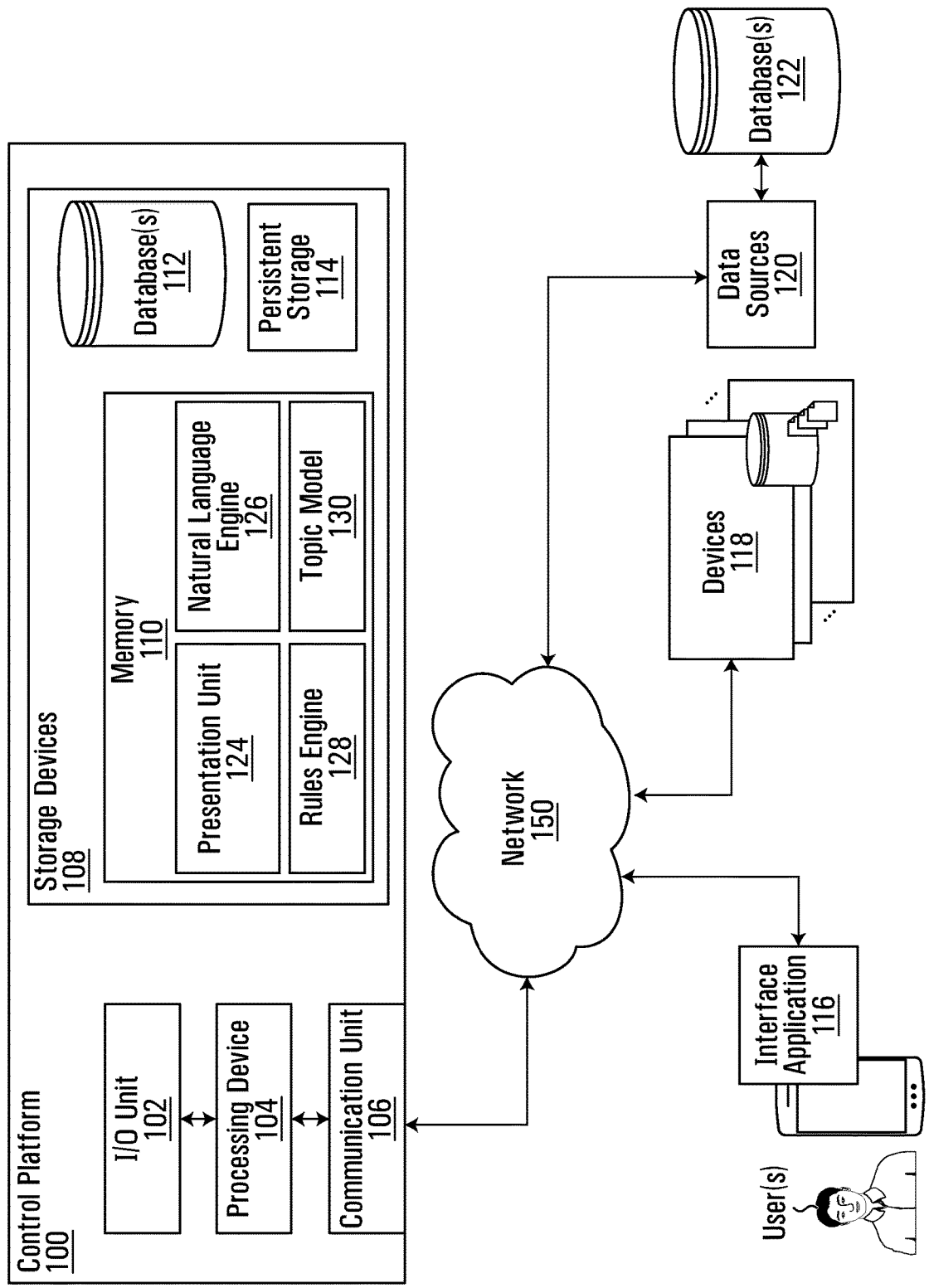
FIG. 1 is an example system for change management control according to some embodiments.

FIG. 1 is an example control platform 100 according to some embodiments. The control platform includes an I/O unit 102, processing device 104, communications unit 106 and storage device 108. The storage device 108 can include databases 112, persistent storage 114, and memory 110. The control platform 100 can connect to interface application 116, devices 118 and data sources 120. The memory 110 can include instructions executable by the processing device 104 to configure a presentation unit 124, natural language engine 126, rules engines 128 and a topic model 130.

The natural language engine 126 has a risk-based corpora to help the control platform 100 automatically understand terms of change records (CRs). The terms of the CRs may hold different meanings in different fields or domains. A CR can refer to a service management ticket or data construct in the Information Technology Infrastructure Library (ITIL) domain for organizational changes, software releases and request fulfillment that are typically supported by a service catalogue and a change management database.

The rules engines 128 receives feature vectors from labelled change records for training the topic model 130. The rules engines 128 can apply business rules to cleanse data and process binary checks. A business rule can have a description such as minimum length, invalid input, key attributes, and so on.

The topic model 130 receives new CRs that can be represented as feature vectors to generate expected labels. The new CRs can be an unlabelled CRs. That is, the topic model generates an expected label for an additional (unlabelled) change record based on training data generated from labelled change records and risk-based corpora.

The topic model 130 can extract a topic from the additional change record using latent semantic analysis (LSA) to discover a semantic structure of text of the additional change record using the training data. The topic model 130 can implement a similarity query for the additional change record against the labelled change records to determine a probabilistic label for the additional change record within a configurable similarity threshold. Example labels include pass, fail, suspense. The topic model 130 can determine that the additional change record is an outlier and triggers the presentation unit to update the interface with outlier data for verification.

The topic model 130 can convert the labelled change records into feature vectors and the additional change record into additional feature vectors. An aggregate of the feature vectors can be used to generate or update the risk-based corpora. The topic model 130 can determine a structure of the additional change record using a term frequency and inverse document frequency real-valued weights model. The topic model 130 can use latent semantic analysis to extract conceptual content and identify patterns in the additional change record.

The presentation unit 124 connects with interface application 116 to generate and update interfaces with visual elements and receive control comments. The presentation unit 124 generates an interface for display at an interface application 116. The interface has visual elements corresponding to the expected label.

The topic model 130 can generate an expected label for an additional change record based on a similarity query by comparing an additional feature vector generated from the additional change record and the feature vectors generated from the labelled change records. In some embodiments, the expected label is selected from pass, fail, or suspense. In some embodiments, topic model 130 can compute a score for the similarity query based on a cosine measurement between the additional feature vector and a feature vector of the feature vectors.

The topic model 130 can compute a probabilistic classification for the additional change record, the probabilistic classification can correspond to the expected label. The topic model 130 is trained using the risk-based corpora. In some embodiments, the topic model 130 implements unsupervised learning to compute a semantic similarity score between the additional change record and one or more of the labelled change records. In some embodiments, the topic model 130 implements supervised learning to compute the probabilistic classification and a corresponding confidence score.

In some embodiments, the topic model 130 compares the confidence score to a confidence threshold. Upon determining that the confidence score does not meet the confidence threshold, the topic model 130 flags the additional change record for review. Upon determining that the confidence score meets the confidence threshold, the topic model 130 assigns the expected label to the additional change record. In some embodiments, the topic model 130 receives results of the review for training.

As noted, the topic model 130 and natural language engine 126 can use a similarity score, similarity threshold, confidence or precision score, and a confidence or precision threshold for processing unlabelled CRs. The following provides an example. A new change record is assessed by the the topic model 130. There can be many labeled CRs (e.g. pass/fail/suspense) in the training model (or corpus). The new (unlabelled) change record can have a similarity score $>=65\%$ (e.g. similarity threshold) to 4× pass CRs, 2× fail CRs, and 0× suspense CRs, for example. In aggregate, this means that the new change record has a $4/6=66.6\%$ precision score to passing records and a $2/6=33.3\%$ precision to failing records. The topic model 130 then looks at the highest similarity rating or score (66.6% in this case) and verifies that the score >=the 65% precision rating/threshold. In this case it is above the threshold and the topic model 130 can assign the pass label to the new CR. If it were <65% (threshold), it would be assigned suspense ("outlier") because the topic model 130 is not confident enough to assign a pass/fail label and requires manual review.

Figure 6:
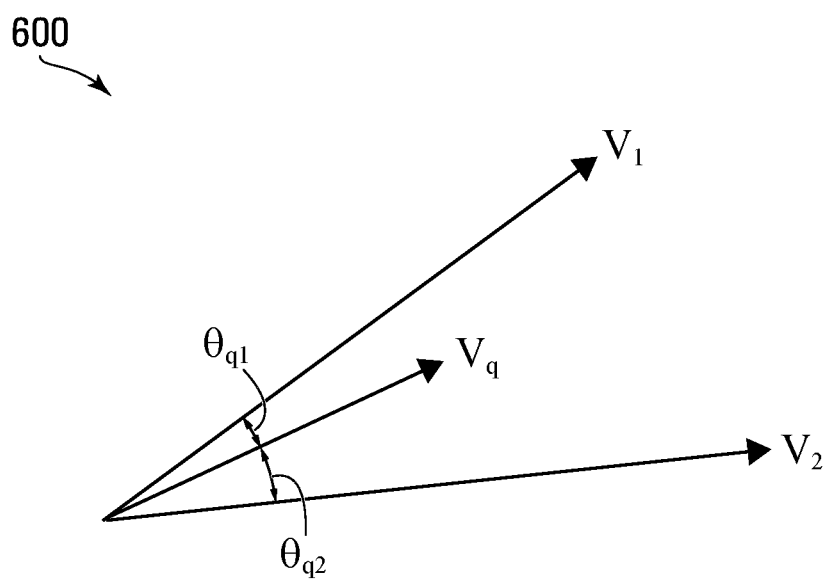
FIG. 6 is a diagram of an example simplified vector space model according to some embodiments.

After the topic model 130 has been trained on labelled change records (e.g. that have been labelled passed or failed based on the Enterprise Control Framework). The labelled CRs can be plotted in multi-dimensional vector space (as shown in FIG. 6 as V1 and V2) based on their semantic markup and configured business rules. When new (unlabelled) CRs are queried against the model (Vq of FIG. 6), the similarity between the new CR and those in the model can be measured as the cosine between the vectors (θq1, θq2 of FIG. 6). Any Vn that is set to a defined >=65% similarity (based on the example similarity threshold) can be recorded as "close enough" and are used to determine the expected label. The CRs that met or exceeded this threshold are then grouped into those that passed and those that failed. An average similarity percentage across all passing and failing CRs, respectively, can be calculated by the topic model 130, which must then exceed a defined >=65% as example precision (or "confidence") threshold in order for the topic model 130 to make a confident decision. Any expected labels that do not meet or exceed this precision threshold can be sent to a Suspense Queue for review.

The similarity rating can be computed by the topic model 130 using a supervised learning process (based on the pass/fail/suspense labels of the training model). The precision/confidence rating is a check to verify confidence. The topic model 130 can implement unsupervised learning for generating the training vectors.

The probabilistic classification (pass/fail/suspense) of the new change record can be generated by the topic model 130 through use of latent semantic analysis (LSA).

In some embodiments, the topic model 130 extracts a topic from the additional change record using one or more vector space models, to discover a semantic structure of text of the additional change record. In some embodiments, the topic model 130 implements a semantic similarity query to compare the additional change record against the labelled change records to determine a similarity score for the additional change record within a similarity threshold.

In some embodiments, the topic model 130 determines that the additional change record is an outlier based on a confidence threshold and triggers the presentation unit 124 to update the interface with outlier data for verification, wherein the results of the verification update or train the topic model.

In some embodiments, the topic model 130 generates the additional feature vectors from the additional change record using a bag-of-words model to represent the additional change record as a multiset of words that retains multiplicity and disregards grammar and word order. The topic model 130 converts the multiset of words using a term frequency and inverse document frequency real-valued weights model to identify semantic relationships between features of the additional change record. The topic model 130 extracts topics using latent semantic analysis by identifying patterns in the semantic relationships between words of the additional change record.

In some embodiments, the topic model 130 is trained using one or more model parameters such as number of topics, power iterations, extra sampling, similarity threshold, precision threshold, or a similarity and precision threshold relation. In some embodiments, the topic model 130 is configured to determine a structure of the additional change record using one or more vector space models. In some embodiments, the topic model 130 is configured to use one or more vector space models to extract conceptual content and identify patterns in the additional change record for comparison to the risk based corpora.

The natural language engine 126 can receive feature vectors generated from labelled change records and update the risk-based corpora. The feature vectors can represent topics from the labelled change records. In some embodiments, the natural language engine 126 generates the risk-based corpora by tokenizing and cleansing the labelled change records to generate the feature vectors. In some embodiments, the natural language engine 126 converts the labelled change records to feature vectors using a bag-of-words model to represent each of the labelled change records as a multiset of words that retains multiplicity and disregards grammar and word order. In some embodiments, the natural language engine 126 converts the labelled change records to feature vectors using a term frequency and inverse document frequency real-valued weights model to identify semantic relationships between words of the labelled change records.

In some embodiments, the natural language engine 126 converts the labelled change records to feature vectors using latent semantic analysis to extract conceptual concepts from the labelled change records and patterns in semantic relationships between words of the labelled change records. The natural language engine 126 computes topics for semantic similarity queries.

In some embodiments, the natural language engine 126 generates the feature vectors from the labelled change records, by, for each of the labelled change records, using a bag-of-words model to represent the respective labelled change record as a multiset of words that retains multiplicity and disregards grammar and word order. The natural language engine 126 converts the multiset of words using a term frequency and inverse document frequency real-valued weights model to identify semantic relationships between features of the respective labelled change record. The natural language engine 126 extracts topics using LSA by identifying patterns in the semantic relationships between words of the respective labeled change record.

The processing device 104 may be, for example, any type of general-purpose microprocessor or microcontroller, a digital signal processing (DSP) processor, an integrated circuit, a field programmable gate array (FPGA), a reconfigurable processor, or any combination thereof.

The storage device 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O unit 102 enables control platform 100 to interconnect with one or more input devices, such as a keyboard, mouse, camera, touch screen and a microphone, or with one or more output devices such as a display screen and a speaker.

The communications unit 106 enables control platform 100 to communicate with other components, to exchange data with other components, to access and connect to network resources, to serve applications, and perform other computing applications by connecting to a network (or multiple networks) capable of carrying data.

The control platform 100 is operable to register and authenticate user (using a login, unique identifier, and password for example) prior to providing access to applications, a local network, network resources, other networks and network security devices.

The control platform 100 connects to other components in various ways including directly coupled and indirectly coupled via the network. Network 150 (or multiple networks) is capable of carrying data and can involve wired connections, wireless connections, or a combination thereof. Network 150 may involve different network communication technologies, standards and protocols, such as for example.

FIG. 2 is a diagram showing example interface 200 with visual elements corresponding to output generated by the platform 100. The interface application 116 can display interface 200 on device.

The interface 200 can show an entry for each incident record for an Incident Management System, for example. The entry can include different fields, such as incident identifier, application, actual start title, INCS plan, test results (e.g. label with a visual indicator for pass, fail, etc.), precision metric, pass CR, fail CR, last test, and so on. An incident can relate to a group of CRs.

It is also possible to change the train file and upload a new train file for each event. This can dynamically update the interface 200 with new results.

IT environment and technology control failures can have large financial impacts in the market. An example relates to web services when a typo by an employee caused a massive outage at a data centre that impacted 54 of the top 100 online retailers and caused an estimated $310M in losses. Another example relates to financial services when deployment of untested software to the production environment caused an estimated $440M in losses in 30 minutes. A further example relates to trading services when a trading glitch sent out 16,000 mispriced options as a result of an error in trading software which was not tested properly.

A common element among the IT environment failures can be a failure in the IT control environment particularly in change management to ensure that software changes are appropriately tested and have the right level of documentation prior to a production deployment. By understanding what documentation (and in effect, what controls) support a sound change record, the control platform 100 can be employed to minimize such outages from occurring. Further, supervisory functions such as an Internal or External Audit function can rely on the models of the control platform 100 to provide stronger assurance to regulators in an increasingly complex regulatory landscape.

Figure 3:
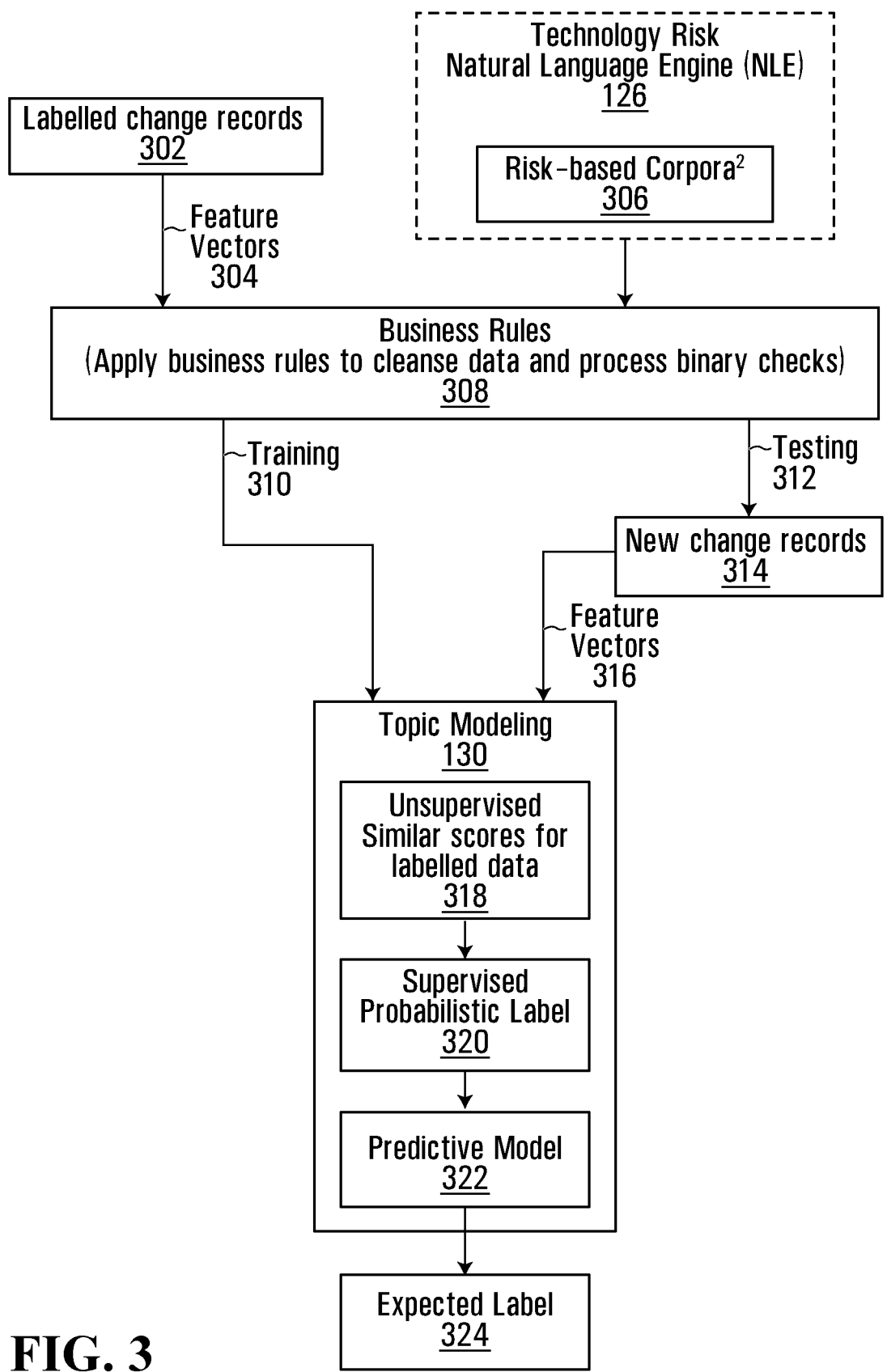
FIG. 3 is an example of system for service management control according to some embodiments.

FIG. 3 is an example of control platform 100 according to some embodiments. The control platform 100 can use one or more machine learning models for change management controls assurance. Control aspects of a change record (CR) can be verified by the control platform 100 prior to deployment to ensure they align with Enterprise Policies, Standards, and so on, thereby providing greater assurance of an error-free production deployment, or code removal, if required.

The control platform 100 receives labelled change records (CR) 302 and extracts feature vectors 304. The feature vectors 304 include topic labels linked to change records 302. In pattern recognition and machine learning, a feature vector 304 is an n-dimensional vector of numerical features that represent some object. The feature vectors 304 can be generated using a software library that generates topics out of the labelled CRs 302. The control platform 100 can clean and process the input data, transform the corpus using term frequency-inverse document frequency to add weights, and use LSA to generate semantic meaning from words to indicate importance. The control platform 100 uses the labels and feature vectors 304 to train the topic model 130 to generate an expected label 324 for a new change record 314. Example labels include pass, fail, and suspense. As shown, labelled change records 302 can be used to generate feature vectors 304 for a training process 310. New change records 312 can also be used to generate features vectors 316 for a testing process 312 or production stage.

The control platform 100 can clean and process the input data normalize data, remove spaces, make text in the same case, and so on. This cleaning and processing can refer to a bag-of-words model, for example. The bag-of-words model is a way of representing text data when modeling text. The bag-of-words model relates to feature extraction or feature encoding from text data. The bag-of-words model can involve a vocabulary of known words and a measure of the presence of known words, for example. Term frequency-inverse document frequency can refer to a numerical statistic that can reflect how important a word is to a document in a collection or corpus. LSA is a technique in natural language processing for analyzing relationships between a set of documents and the terms they contain by producing a set of concepts related to the documents and terms.

The natural language engine 126 includes rules to implement natural language processing (NLP) which is a field of computer science, artificial intelligence and computational linguistics concerned with the interactions between computers and human (natural) languages, and, in particular, concerned with programming computers to process large natural language corpora. The natural language engine 126 includes a risk-based corpora 306 in some embodiments. A risk-based corpora 306 can include dictionaries that help the natural language engine 126 process terms that may hold different meanings in this field as compared with others, e.g., "segregation of duties" or "backout plan".

Figure 4:
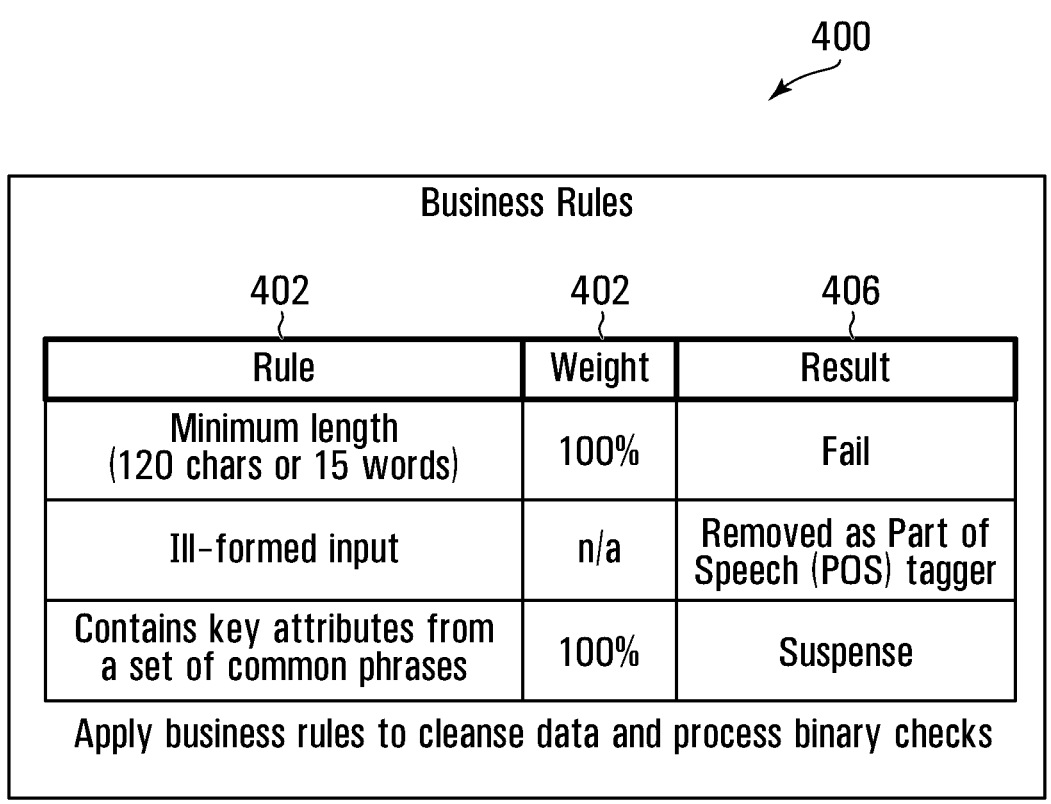
FIG. 4 is a diagram of example business rules that support the risk-based corpora according to some embodiments.

The business rules 308 include rules that apply to cleanse data and process binary checks. FIG. 4 is a diagram of an example business rules 400 according to some embodiments. The business rule 400 includes a rule 402, weight 404 and result 406 (e.g. trigger, control, action, operation). The business rules 308 receive the feature vectors to develop training data 310 for provision to the topic model 130.

Referring back to FIG. 3, the topic model 130 implements natural language processing (NLP) to decision change records and generate an expected label 324. Testing data 312 can include new change records 314 that might be associated with feature vectors 316. The topic model 130 model can implement unsupervised learning 318 based on similar scores for labelled data and supervised learning 320 based on probabilistic labels. The unsupervised learning 318 process generates features and topics without knowing the topics beforehand. The unsupervised learning 318 process involves processing the CRs to generate topics using the operations described herein that relate to cleaning and pre-processing using a bag-of-words model, transforming the corpus using term frequency-inverse document frequency to add weights, and using LSA to take the semantic meaning of the word to indicate its importance. The unsupervised learning 318 uses a similarity threshold to determine semantic similarity between labelled and unlabelled CRs. The supervised learning 320 process uses a precision threshold to compare the CR 314 to other CRs for similarity based on the label suggested by the unsupervised learning 318 step (e.g. the CRs considered for similarity are labeled the same as the suggested label). The unsupervised learning 318 process suggests label or topic X (e.g. pass labels) and the supervised learning 320 step compares the CR 314 to CRs with pass labels to see if it is similar to them. If it fails then the topic model 130 can flag an exception for review. The topic model 130 improves with input and feedback for exceptions to improve over time and with additional input. For some CRs there is a required manual check and the results of the review can be provided as feedback to platform 100 for updates. Unsupervised learning 318 can be used to better understand what is in the change record itself (discovery of the content) as the platform 100 wants to avoid general buckets and get a more nuanced understanding of the new CR 314.

The topic model 130 includes a predictive model 322 to decision change records and generates an expected label 324 using the results of the unsupervised learning 318 and the supervised learning 320 processes. The topic model 130 can indicate labels such as passes/fails for records that relate to different types of events. For example, the topic model 130 can indicate labels such as passes/fails for change records based on the semantic similarity of their key control elements. Examples include Implementation Plans (IMPL), Backout Plans (BOP), and Post Implementation Verification (PIV) plans, to a known model. Outliers can be sent to a suspense queue to be manually labelled and fed back into the model to re-learn. The supervised learning process 320 can flag outliers. For example, if the supervised learning process 320 does not detect similarities (within the precision threshold) between the CR 314 and others having the same label as the label suggested by the unsupervised learning 318 process. New change records that cannot be labelled above the designated precision or "confidence" threshold can be put in a suspense queue for manual classification. The threshold is configurable to retrain topic model 130 to manage drift.

The configurable similarity and precision thresholds enable retraining of the predictive model 322 to manage model drift against new policies. The code can be deployed server side, for example, and integrated into web applications or service management, or governance, risk, and compliance platforms. The predictive model 322 generates an expected label 324 for new change records 314. New change records 314 that cannot be labelled above a precision or confidence threshold can be put into a suspense queue for classification and review.

Figure 5:
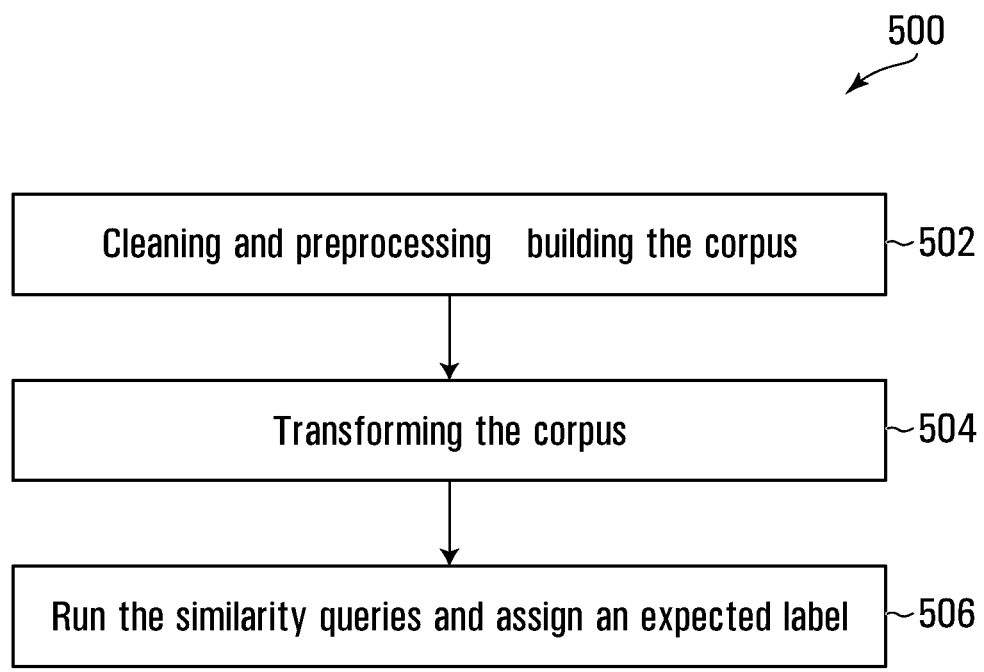
FIG. 5 is an example process for service management control according to some embodiments.

FIG. 5 is an example process 500 for service management control according to some embodiments. The process 500 can be implemented by control platform 100 and components thereof such as a topic model 130, for example.

The control platform 100 (or topic model 130) extracts topics from change records (CRs) using Latent Semantic Analysis (LSA) to discover a semantic structure of texts by examining statistical co-occurrence patterns of the words within a corpus of training documents. Similarity queries are then performed using new CRs against labelled CRs to determine a probabilistic label for the new CR within a stated precision threshold. Outliers are sent to a suspense queue to be labelled and fed back into the model to re-learn.

Topics are extracted from change records (CRs) using an LSA process to discover a semantic structure of texts by examining statistical co-occurrence patterns of the words within a corpus of training documents. Similarity queries are then performed using new CRs 314 against labelled CRs 302 to determine a probabilistic label 324 for the new CR 314 within a stated precision threshold. Outliers are sent to a suspense queue to be labelled and fed back into the model to re-learn.

The control platform 100 uses model parameters for the training stage. Model parameters can include number of topics, power iterations, extra sampling, similarity threshold, precision threshold, and so on.

For example, a model parameter can be a number of topics. This can be set to 50, for example. The dimension of the vector space can be relatively high. Using LSA, the data are projected to a lower dimension space, the dimension of which is equal to the number of topics, for example. An example value for this parameter is determined to be 50 based on tests aimed at the highest accuracy.

For example topic #1 can be: (7.061): 0.834*"attached"+ 0.396*"see"+0.220*"please"+0.152*"document"+ 0.146*"plan"+0.073*"cr"+ 0.064*"doc"0.063*"implementation"+0.055*"detail"+ 0.053*"rollback"

As another example, a model parameter can be power iterations, which can be set to 400, for example.

For LSA, the eigenvectors space can be computed using The Power Method. This parameter determines the number of iterations. A higher value increases the accuracy at the expense of more computation time.

As another example, a model parameter can be extra sampling, which can be set to 400, for example. This parameter can be used in conjunction with rank k (number of factors) for improving accuracy.

As a further example, a model parameter can be similarity threshold, which can be set to 0.65, for example. Similarity queries can be used to compare new, unlabeled CRs to the labelled CRs in the corpus to return results that are conceptually similar in meaning to what was searched even if the results do not share any specific words. CRs can exceed a defined similarity threshold to be considered 'close enough'.

As a further example, a model parameter can be precision threshold, which can be set to 0.65, for example. Based on the training documents, a probabilistic classification for the new CR can be determined. Labels that do not exceed a defined precision threshold are sent to a Suspense Queue for manual review. The reviewed labels can be used to train the model.

As a further example, a model parameter can be similarity and precision threshold relation. After the model has been trained on change records that have passed or failed based on the Enterprise Control Framework, these CRs can plotted in multi-dimensional vector space (V1 and V2 examples in FIG. 6) based on their semantic markup and configured business rules. When new CRs are queried against the model (Vq in FIG. 6), the similarity between the new CR and those in the model are measured as the cosine between the vectors ($\theta q1$, $\theta q2$ in FIG. 6). Any Vn that is set to a defined >=65% similarity is recorded as "close enough" and are used to determine the expected label. The CRs that met or exceeded this threshold are then grouped into pass and fail. An average similarity percentage across all passing and failing CRs, respectively, is calculated, which must then exceed a defined >=65% precision (or "confidence") threshold in order for the topic model 130 to make a confident decision. Any expected labels that do not meet or exceed this precision threshold are sent to a Suspense Queue for manual review.

Configurable similarity and precision or confidence thresholds enable the platform 100 to retrain the topic model 130 to manage model drift against new Enterprise policies. Model drift can be defined as a growing variance between expected/trained results and that which is calculated by the model 130 given a new set of test data, or changes in the enterprise control framework.

The example numbers are based on a tested approach that yielded the highest accuracy in experiments.

At 502, the topic model 130 implements cleaning and preprocessing for building the corpus through tokenization using methods such as: removing stop words, punctuation, lemmatization, and capitalization. The Natural Language Engine 126 combined with the topics derived from the topic model 130 can be used to create a risk-specific corpora that will enable the topic model 130 to be applied to other use cases. A risk based corpora can include dictionaries that help the Natural Language Engine 126 understand terms that may hold different mearings in a particular field as compared to other fields.

At 504, the topic model 130 transforms the corpus. The topic model 130 can convert documents to vectors (e.g. change records to feature vectors) using a bag-of-words model that simplifies the document by representing the CR as a multiset of its words, disregarding its grammar and word order but keeping multiplicity. The output of this is a numerical 'feature' (vector) that is used for training models, and the aggregate forms the basis of the 'dictionary' (or a 'corpus of documents').

The topic model 130 can bring out hidden structure in the corpus and discover relationships between the words in a more semantic way, and transform the bag-of-words corpus using Term Frequency*Inverse Document Frequency (Tfldf) real-valued weights model. The Tfldf model allows the topic model 130 to evaluate how important a word is to the topic of a document or CR.

The topic model 130 can utilize Latent Semantic Analysis (LSA) to extract the conceptual content and to identify patterns in the relationships between the features identified by Tfldf to generate a defined number of topics that can be used for similarity queries.

At 506, the topic model 130 can run the similarity queries and assign an expected label to a new CR or document. The similarity queries are used to compare new, unlabelled CRs to the labelled CRs in the corpus to return results that are conceptually similar in meaning to what was searched even if the results do not share any specific words. CRs can exceed a defined similarity threshold to be considered 'close enough'. The similarity threshold is configurable. The topic model 130 can compare an unlabelled CR using a suggested label to labelled CRs having the same label as the suggested label to detect similarity, for example.

Based on the training documents or labelled CRs, the topic model 130 can determine a probabilistic label for the new CR. Labels or CRs that do not exceed a configurable precision threshold can be sent to a Suspense Queue for review and labelling. These can be feed back into platform 100 for training.

After the model has been trained on CRs that have passed or failed based on an Enterprise Control Framework, Policy or Standard, these CRs can be plotted in multi-dimensional vector space based on their semantic markup and configured business rules.

FIG. 6 is a view showing simplified 2-dimension vector space model 600 (with vectors $V_1$ and $V_2$) which is used for similarity queries. A new change record is assessed by the platform 100. There can be many labeled CRs (pass/fail/suspense) in the training model. The platform 100 can compute that the new change record has a similarity >=65% to 4× pass CRs, 2× fail CRs, and 0× suspense CRs, for example. In aggregate, this means that the new change record has a 4/6=66.6% precision to passing records and a 2/6=33.3% precision to failing records. The platform 100 can then look at the highest similarity rating (66.6% in this case) and verifies that it is >=the 65% precision rating. In this example it is and so the platform 100 can assign the pass label to the new record. If it were <65%, it would be assigned suspense ("outlier") because the platform is not confident enough to assign a pass/fail label and requires review.

The diagram is simplified to show a 2-dimensional vector space 600 but the actual dimensions used in some example models can be any reasonable integer-based value based on a tested approach for the number of dimensions that yields the highest accuracy, or other metrics, for example.

When new CRs are queried against the model ($V_q$ of FIG. 6), the similarity between the new CR and those in the model can be measured as the cosine between the vectors ($\theta_{q1}$, $\theta_{q2}$ of FIG. 6). Any $V_n$ that is set to a defined >=threshold similarity (e.g. 65% similarity) are recorded as "close enough" and are used to determine the expected label. The similarity threshold of 65% can be based on a tested approach for the threshold that yielded the highest accuracy in some experiments. The CRs that meet or exceed this threshold can be grouped into those that passed and those that failed. An average similarity percentage across all passing and failing CRs, respectively, is calculated, which then can exceed a defined >=threshold similarity (65% precision) or "confidence" threshold in order for the topic model 130 to make a confident decision. Any expected labels that do not meet or exceed the precision threshold can be sent to a suspense queue for review.

FIG. 7 is a view showing an interface 700 with sample visual elements on an interface application 116 based on output generated by platform 100. The visual elements can show the precision of each CR expected label as a numerical value, for example. The visual elements can also include buttons that enable changes or updates to the platform 100, such as configuration of the precision threshold, for example. The interface application 116 sends commands to platform 100 trigger lookups to populate codes with intuitive words. The platform 100 can send the information to a risk intelligence platform that aggregates the output for platform 100 to generate visual elements for the labels (e.g. the items that passed, the items that failed but overall the document passed).

Accuracy can be calculated by passing the topic model 130 CRs that have already been tested and have a pass or fail label already, but for which the model has not been trained on. The topic model 130 then assigns an expected label and compares against the actual pass or fail label that was previously assigned. This verification can be performed on a periodic basis to protect against model drift. Accordingly, topic model 130 can be continuously trained on new labelled CRs and tested by comparing expected labels (generated by prediction model) to the assigned labels.

A Controls Assurance Unit can review the expected labels periodically and feed the verified results back into the topic model 130 to retrain the model on new occurrences or to reinforce existing logic. A period of parallel testing can be undertaken to build confidence in the topic model 130 before transitioning fully to the automated approach.

FIG. 8 is the sample log output 800 from the topic model 130 showing an 85% accuracy result of an example backout plan test. The output can be displayed as part of interface application 116, for example, and is to be used for diagnostic or debugging purposes.

The control platform 100 can integrate with an existing Governance, Risk and Compliance (GRC) platform and data lakes to allow Controls Assurance Teams the ability to verify test results and to retrain the topic model 130.

FIG. 9 is a view of an interface 900 showing the chain of commands to verify test results. The control platform 100 integrates with different enterprise frameworks to generate rules for a CR to pass or fail. The control platform 100 can generate an interface 900 with dynamic filters to provide quick access to the data needed to review, including the CR document identifier, underlying data, and so on.

The control platform 100 can use machine learning to help a controls assurance or supervisory function.

Figure 10:
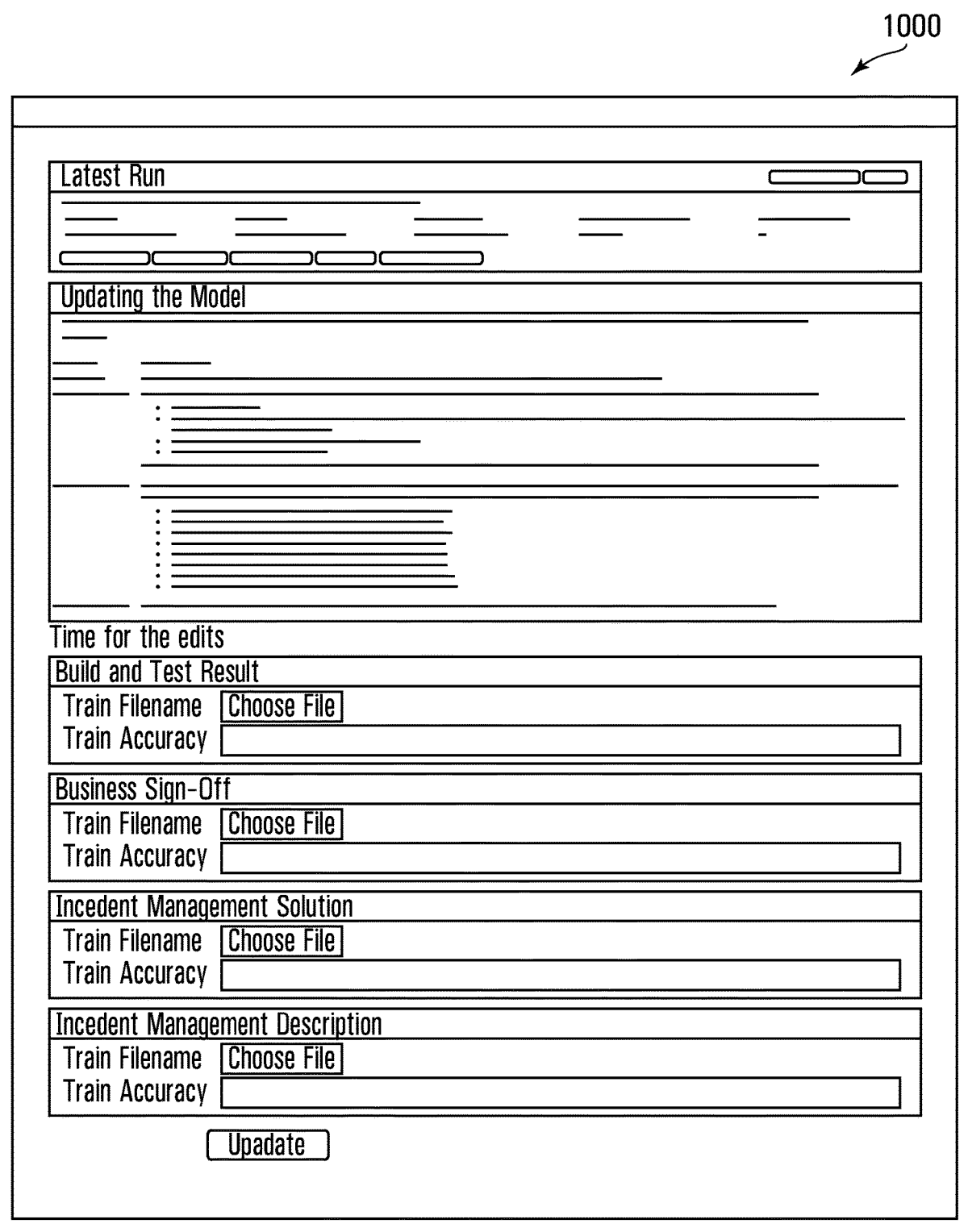

FIG. 10 is another example interface 1000 according to some embodiments. The interface 1000 can relate to a runbook of visual elements corresponding to data relating to runs of platform 100. The data can relate to a current or recent run of the platform 100. The data can indicate different variables or parameters used by platform 100 for updating one or more models (such as topic model 130). The interface 1000 can include one or more fields for editing or updating parameters or variables. Examples include build and test result, business sign off, incident management solution, incident management description, and so on.

Figure 11:
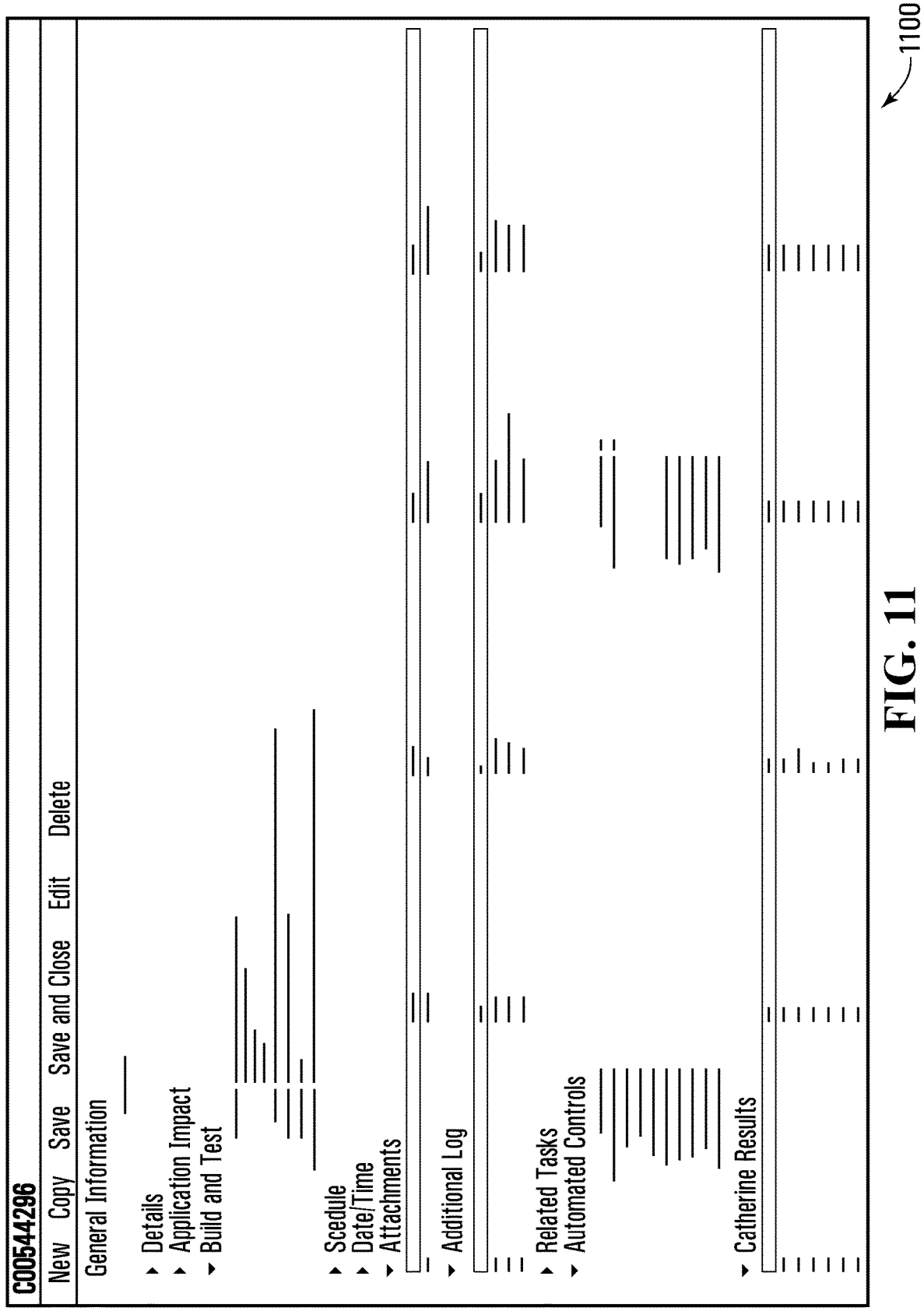
FIG. 11 demonstrates how the data produced by this embodiment can be visualized in control systems as part of an interface according to some embodiments.

FIG. 11 an example interface 1100 according to some embodiments. The interface 1100 can be integrated with an enterprise governance, risk and compliance platform, for example. The interface 1100 can indicate a CR and the output result of the platform 100.

FIG. 12 an example interface 1200 according to some embodiments. The interface 1200 can be integrated with an enterprise governance, risk and compliance platform, for example. The interface 1200 can indicate an incident record and the output result of the platform 100.

Figure 13:
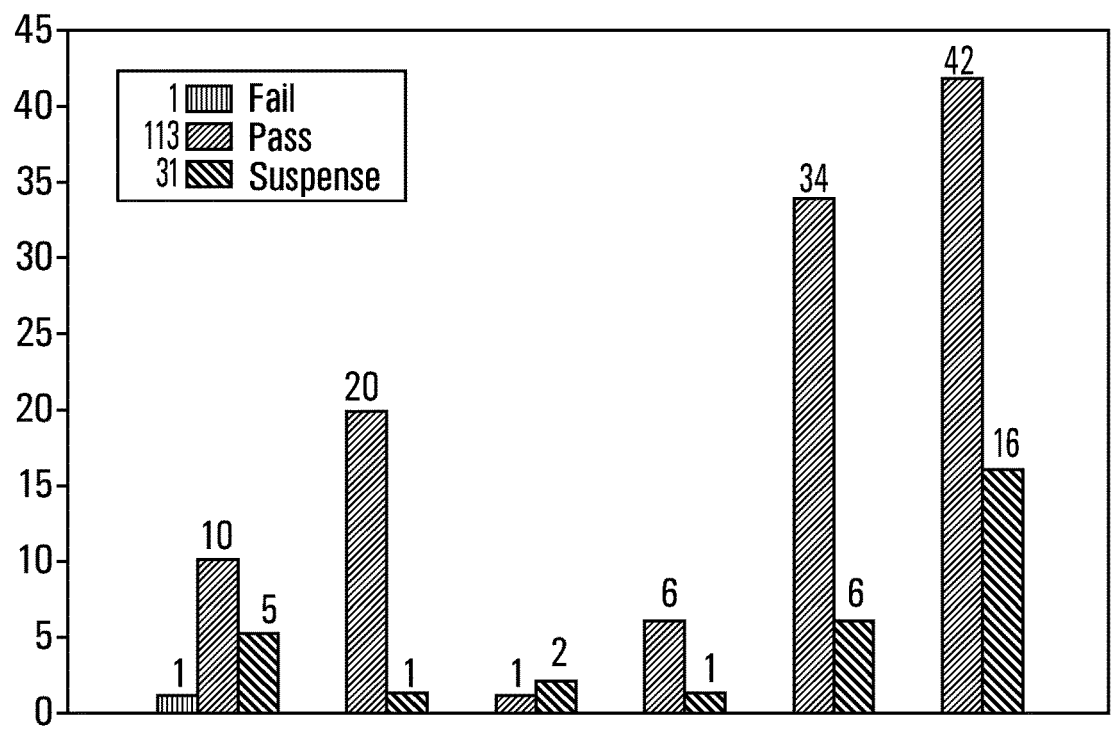
FIG. 13 an example visual representation corresponding to a chart according to some embodiments.

FIG. 13 an example visual representation corresponding to a chart 1300 according to some embodiments. The chart 1300 can correspond to a visual element of an interface. The chart 1300 can be an incident management chart.

Figure 14:
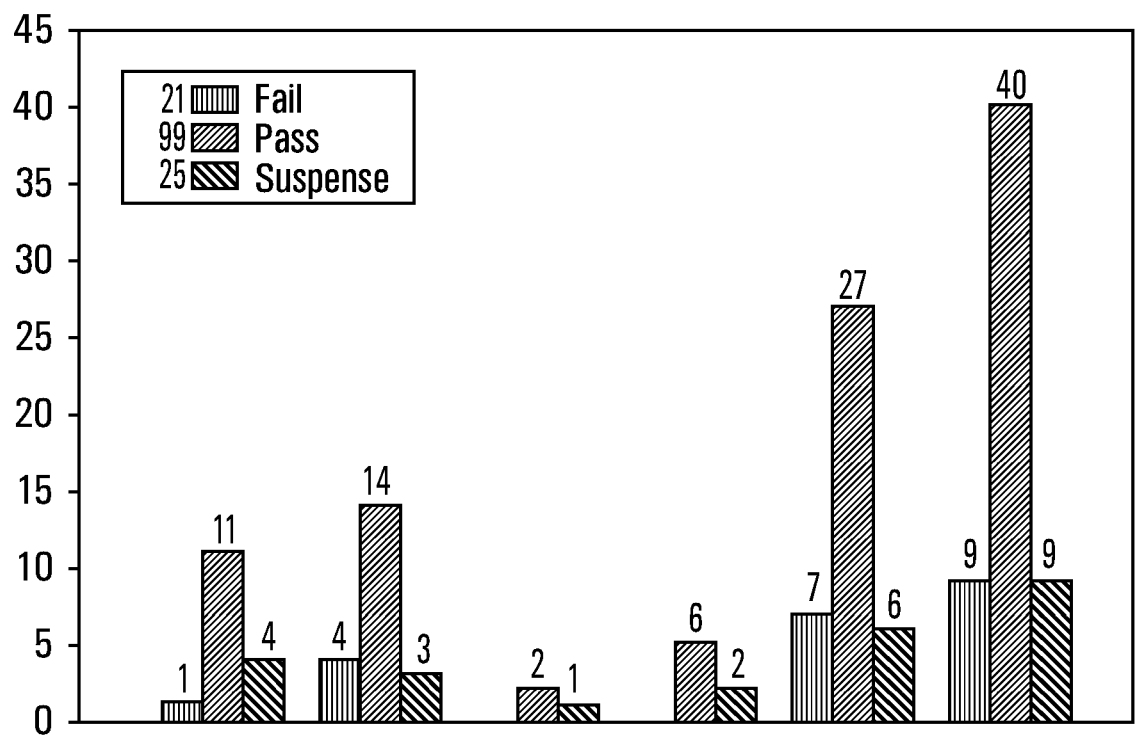
FIG. 14 an example visual representation corresponding to a chart according to some embodiments.

FIG. 14 an example visual representation corresponding to a chart 1400 according to some embodiments. The chart 1400 can correspond to a visual element of an interface. The chart 1400 can be an incident management chart.

Figure 15:
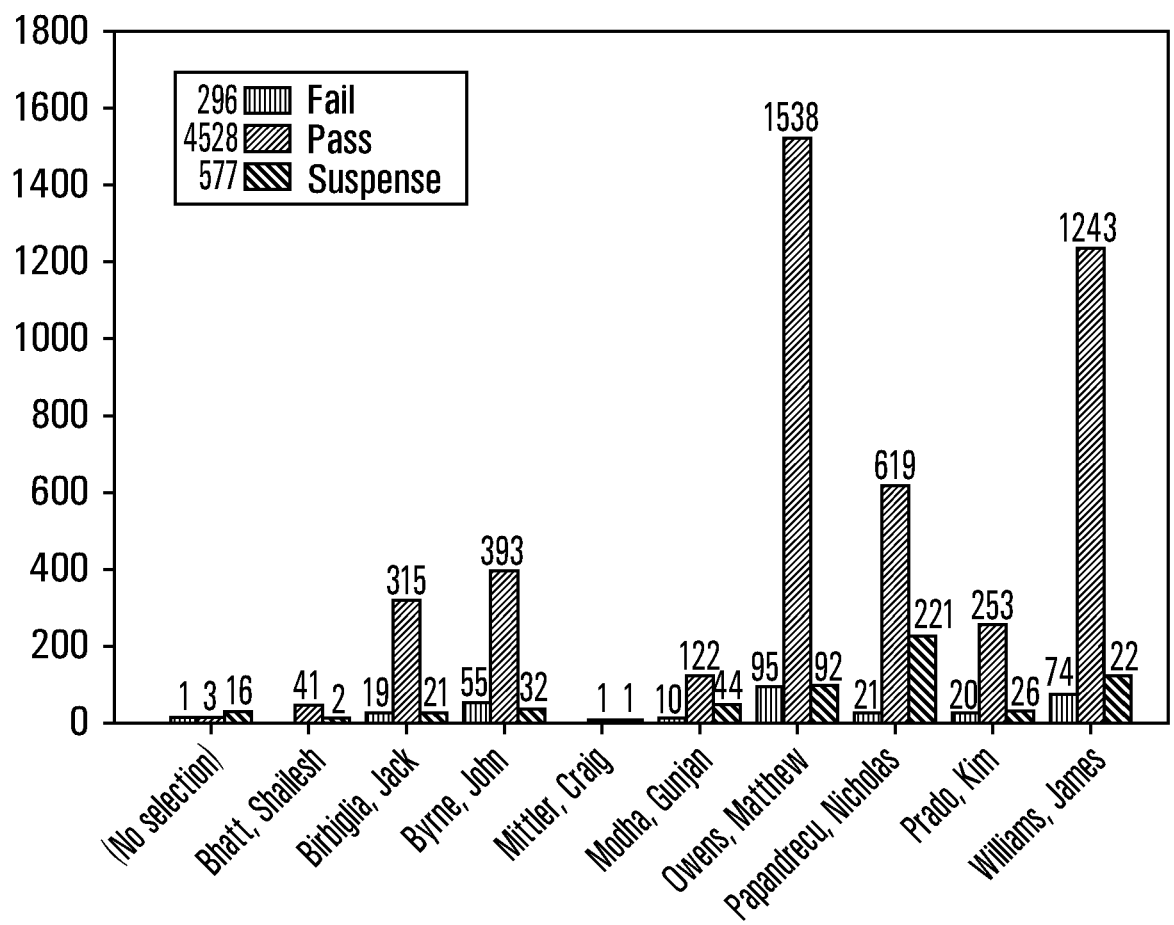
FIG. 15 an example visual representation corresponding to a chart according to some embodiments.

FIG. 15 an example visual representation corresponding to a chart 1500 according to some embodiments. The chart 1500 can correspond to a visual element of an interface. The chart 1500 can be a change management chart.

Figure 16:
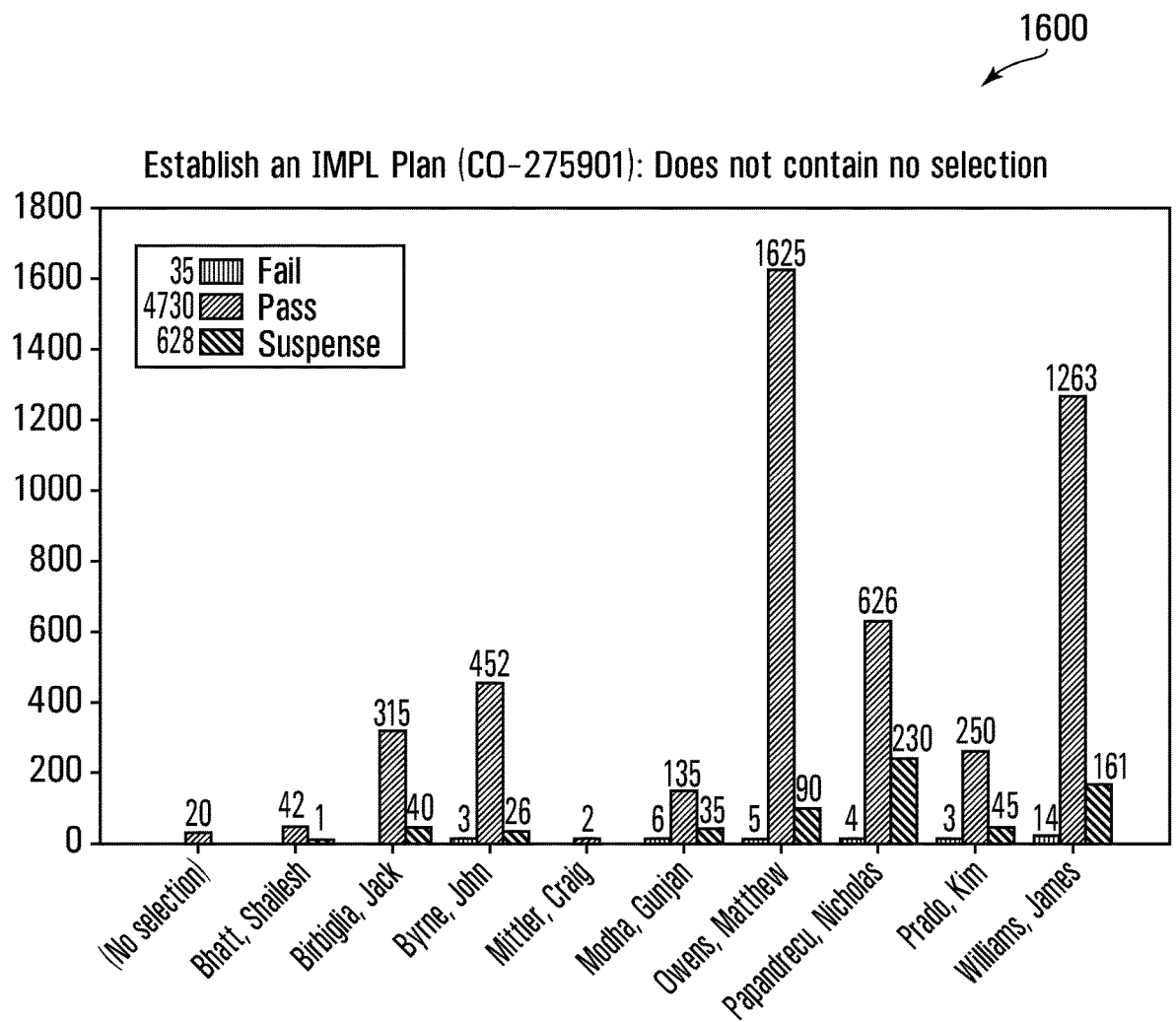
FIG. 16 an example visual representation corresponding to a chart according to some embodiments.

FIG. 16 an example visual representation corresponding to a chart 1600 according to some embodiments. The chart 1600 can correspond to a visual element of an interface. The chart 1600 can be a change management chart.

Figure 17:
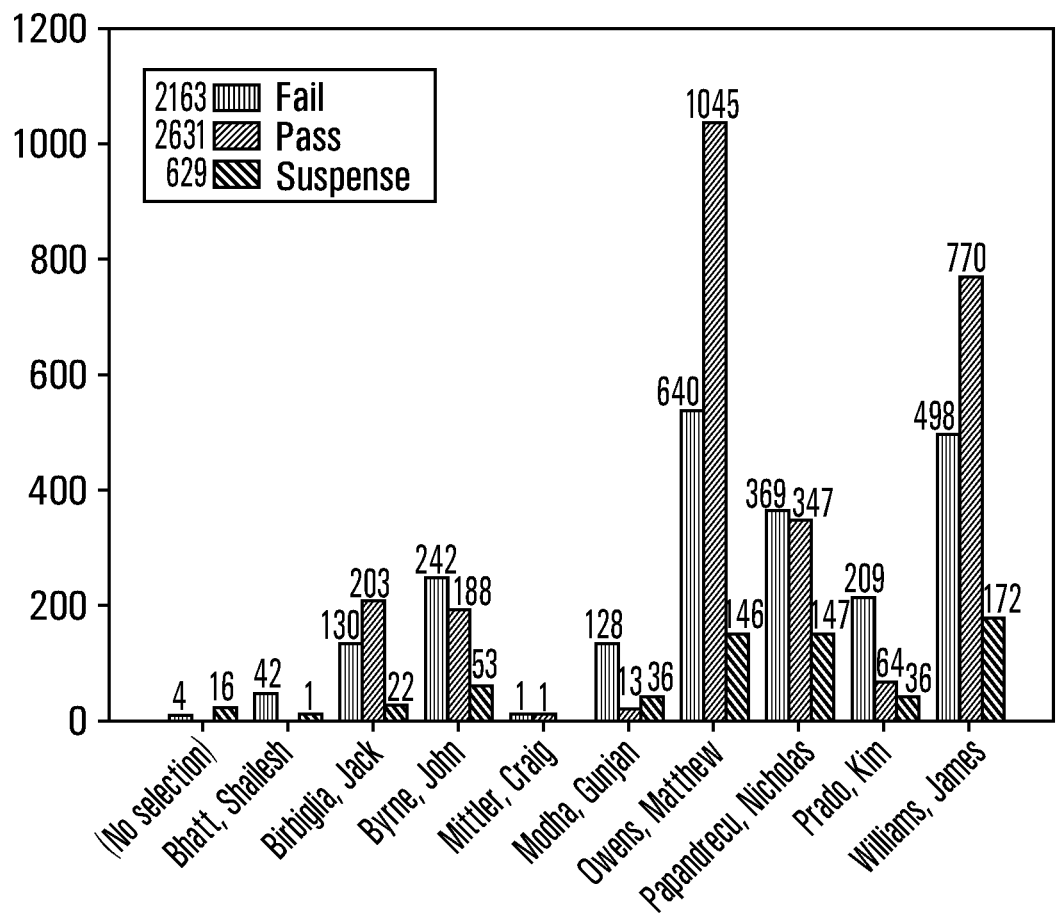
FIG. 17 an example visual representation corresponding to a chart according to some embodiments.

FIG. 17 an example visual representation corresponding to a chart 1700 according to some embodiments. The chart 1700 can correspond to a visual element of an interface. The chart 1700 can be a change management chart.

Figure 18:
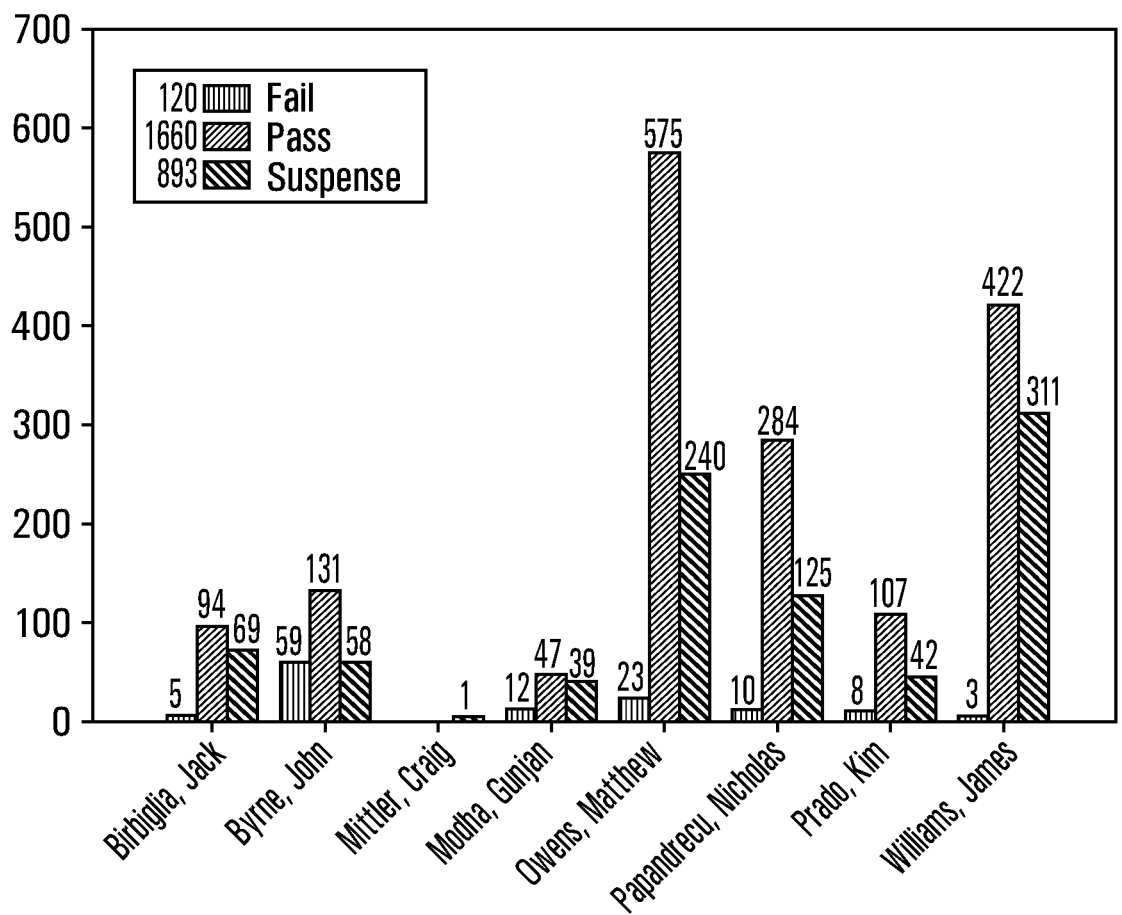
FIG. 18 an example visual representation corresponding to a chart according to some embodiments.

FIG. 18 an example visual representation corresponding to a chart 1800 according to some embodiments. The chart 1800 can correspond to a visual element of an interface. The chart 1800 can be a change management chart.

Figure 19:
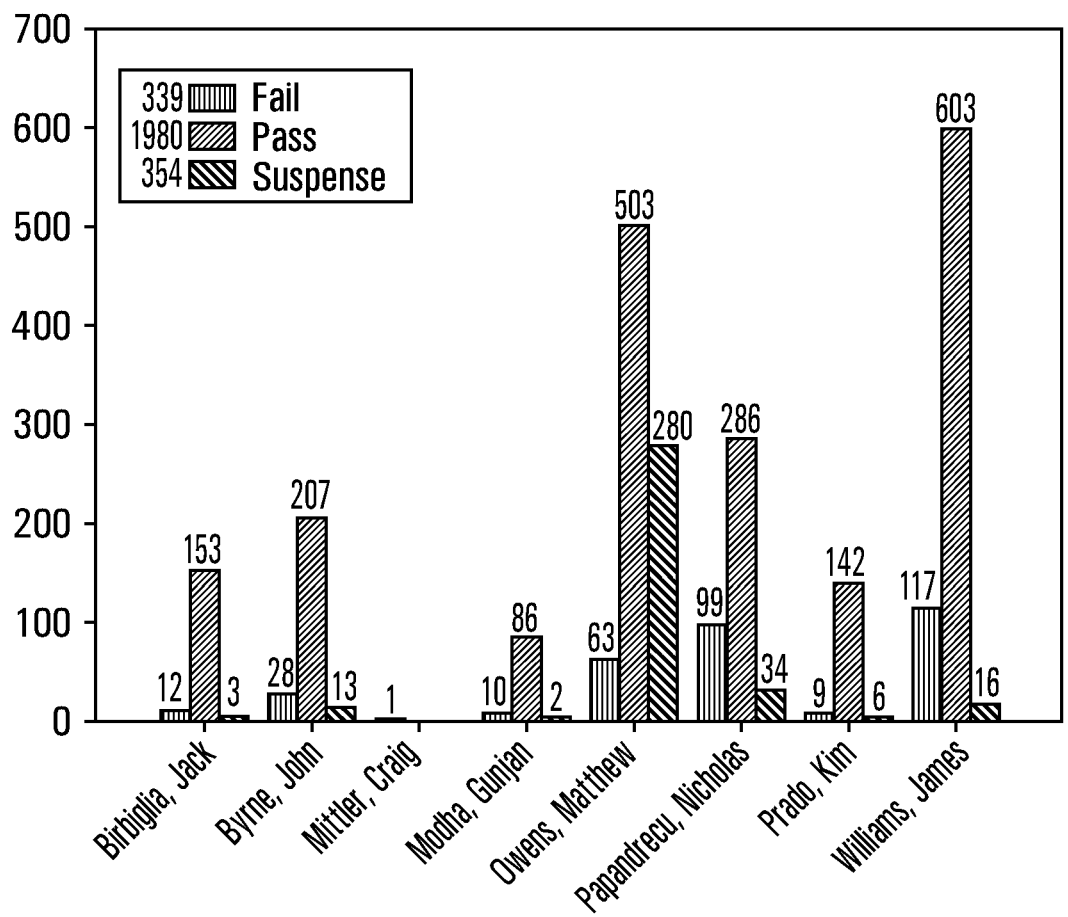
FIG. 19 an example visual representation corresponding to a chart according to some embodiments.

FIG. 19 an example visual representation corresponding to a chart 1900 according to some embodiments. The chart 1900 can correspond to a visual element of an interface. The chart 1900 can be a change management chart.

Figure 20:
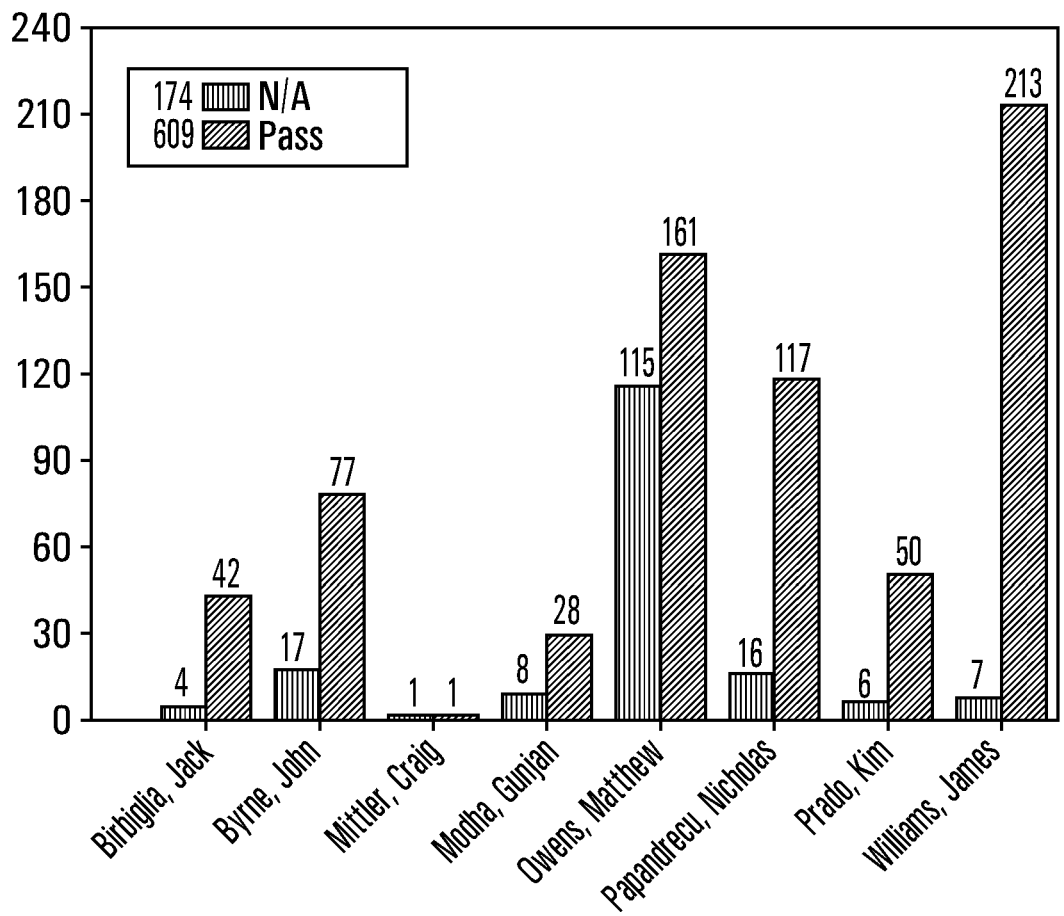
FIG. 20 an example visual representation corresponding to a chart according to some embodiments.

FIG. 20 an example visual representation corresponding to a chart 2000 according to some embodiments. The chart 2000 can correspond to a visual element of an interface. The chart 2000 can be a change management chart.

The records processed by platform 100 can relate to different events. Example events include change management, Incident management (Solution, Incident), Business Test Plan (BTP), Business Test Result (BTR) and Business Sign-Off (BSO). The process logic for BTP and BTR can be as described herein for incident management, however, there might not be a need to check an attachment for incident management events.

The process logic for BSO can involve the following operations: pass CRs (e.g. label with a pass) based on fields of the test plan and test result description; if Category is Standard Change, pass CR (e.g. label with a pass) on sign-off; if not passed in step (1) or (2), fail the CRs with no attachment (e.g. label with a fail); pass CRs if their attachment name contains one of a listed key phrases (e.g. label with a pass); the status of the rest CRs are suspense (e.g. label with suspense).

The following provides an example of the lifecycle of a CR and an incident record.

The lifecycle of a CR and an incident record includes the following example operations.

The platform 100 receives raw data.

The platform 100 pre-processes the data and performs a clean-up. The platform 100 can tokenize the documents and remove stop words and all punctuation, lemmatize the words, and make lower case, for example.

The platform 100 implements a bag-of-words model. The platform 100 can convert documents to vectors using a bag-of-words model that simplifies the document by representing the CR as a multiset of its words, disregarding its grammar and word order but keeping multiplicity. The output of this is a numerical 'feature' (vector) that is used for training models, and the aggregate forms the basis of a 'dictionary' (or a 'corpus of documents').

The platform 100 implements Tfldf. To bring out hidden structure in the corpus and to discover relationships between the words in a more semantic way, the platform transform the bag-of-words corpus to Term Frequency*Inverse Document Frequency (Tfldf) real-valued weights model. The Tfldf model allows the platform 100 to see how important a word is to the topic of a document. The following is an example:

Sample of tfs: {0: 2, 1: 1, 2: 1, 3: 1, 4: 208, 5: 152, 6: 18, 7: 78, 8: 21, 9: 13, 10: 33, 11: 44, 12: 58, 13: 36, 14: 3, 15: 1, 16: 26, 17: 32, 18: 70, 19: 146, 20: 60, 21: 104 . . . }

Sample of ldfs: {0: 9.189824558880018, 1: 10.189824558880018, 2: 10.189824558880018, 3: 10.189824558880018, 4: 2.489384840738925, 5: 2.941897045436432 . . . }

The platform generates the final vector form in LSA. The platform 100 can utilize LSA to extract the conceptual content and to identify patterns in the relationships between the features identified by Tfldf to ultimately generate a defined number of topics that can be used for similarity queries. Example of output of an LSA model is: {u'recreate': 1283, u'consolidated': 1634, u'sys_copy_reports_to_client_location': 1289, u'reboot': 695, u'integrity': 933 . . . }

The lifecycle of a CR is summarized in the table below relative to other events which are: Back Out Plan (BOP), Implementation Plan (IMPL), Post Implementation Verification (PIV), BTP, BTR and BSO.

TABLE

Lifecycle of a change record

| CRID: C00544296 | BOP | IMPL | PIV | BTP | BTR | BSO |
|---|---|---|---|---|---|---|
| Raw Data | The previous version will Not get uninstalled on failed Jobs. This will need to be revisit through Desktop support team or reschedule on later date. | EDS team will create an SCCM job to execute the following programs. Package Name - XUAG - Thomson Reuters Eikon Package ID - 90001XX4 PROGRAM-Install | SCCM report will be sent and desktop team will follow-up on failed jobs. End-user also notified to check software when they get in and report problems. | Same software update push was done to a pilot group on C00541908. | Successful | Raw data from BTP + BTR |
| Bag of words | ["previous", "version", "get", "uninstalled", "fail", "job", "need", "revisit", "desktop", "support", "team", "reschedule", "later", "date"] | ["ed", "team", "create", "sccm", "job", "execute", "following", "program", "package", "name", "xuag", "thomson", "reuters", "eikon", "package", "id", "90001XX4", "program", "install"] | ["sccm", "report", "sent", "desktop", "team", "follow", "fail", "job", "end", "user", "also", "notified", "check", "software", "get", "report", "problem"] | ["software", "update", "push", "done", "pilot", "group", "c00541908"] | ["successful"] | ["software", "update", "push", "done", "pilot", "group", "c00541908", "successful"] |
| STATUS | Pass | Pass | Pass | Fail | Fail | Suspense |
| PRECISION | 0.89 | 0.89 | 0.92 | 0.80 | 0.93 | 0 |
| Similar pass/fail records in the train file | ["C00352869", "C00352545", "C00352473", "C00350270", "C00332260", "C00305316"] | ["C00347502", "C00347886", "C00335740", "C00350270", "C00352473", "C00352545", "C00352869", "C00346573", "C00347884", "C00337933", "C00337933", "C00340232", "C00340232", "C00337910"] | ["C00352869", "C00352545", "C00352473", "C00346573", "C00347884", "C00347886", "C00350270", "C00340232", "C00337933", "C00337910", "C00335740", "C00337933", "C00340232", "C00347502", "C00329828", "C00353349", "C00350474", "C00274583"] | ["C00476449", "C00469242", "C00488811", "C00490680", "C00436634", "C00474465"] | ["C00491181", "C00494299", "C00491612", "C00480465", "C00469475", "C00469447", "C00453301", "C00456766", "C00451216", "C00453042", "C00467538"] | |

The lifecycle of an incident record is summarized in the table below for related events which are: Incident Description (INCD) and Incident Solution (INCS).

TABLE

Lifecycle of an implementation plan record

| INCID: IM02249543 | INCD | INCS |
|---|---|---|
| Raw Data | Please note that there will be delay in availability of data on Dashboards for business date 10th Oct., 2017 due to issues with QlikView Environment. | Applied two folder exclusions to SE132XXX, the weekly scan time of SE132XXX has been updated to 12PM every Sunday Both VSE OAS and AP have been disabled and re-enabled on SE132563 |
| Bag of words | ["please","note","delay","availability", "data","dashboards","business", "date","10th","october","2017","due", "issue","qlikview","environment"] | ["applied","two","folder","exclusion", "se132XXX","weekly","scan","time","se132XXX", "updated","12pm","every", "sunday","vse","oas","ap","disabled", "enabled","se132563"] |

TABLE-continued

Lifecycle of an implementation plan record

| STATUS | Pass | Pass |
|---|---|---|
| PRECISION | 1 | 1 |
| Similar pass/fail records in the train file | ["IM0224XXX3"] | ["IM0224XXX3"] |

In addition, for performance improvement, another flag has been added to create a vector just for new training files and use the previous calculated vectors for the existing ones. That is, platform 100 might only rebuild the corpus if an auditor has added a new change to the model otherwise continue running the old model. This is an efficiency improvement as rebuilding the corpus server and memory intensive. The flag can be: New Train file? False/True, for example.

The platform 100 has the ability to include new labels in the training data and implements a 'suspense' label that tells the model 130 to flag specific test data it recognizes as requiring manual supervision. This augments the existing logic that would rely on calculated outliers to be programmatically flagged as suspense, but this new feature allows an administrator to proactively identify test data that they know is outside the bounds of what can be reviewed by the topic model 130 and so requires manual review. The results of the review can be used to train the topic model 130 to augment its capabilities.

The platform 100 has a new business rule for the supervised learning model that validates whether a file attachment was included in the submission of the change record, thereby augmenting the classifier for pass/fail labels. This can reduce the number of records in Suspense where the model has been trained as Suspense. For example, an indicate of 'See attached for implementation plan' would currently go in Suspense, but if the plan is actually attached to the record, the platform 100 can give the benefit of the doubt and mark this record as a Pass.

In some embodiments, an overall filed can be created for each change record to combine the status of events. If any of the events is failed then the status of the overall can fail as well.

There are example benefits of machine learning.

Machine learning automation in this field has the capability to scale to full population testing with the number of change records processed based on the processing capabilities of the system the topic model 130 is running on. Therefore, greater assurance on the state of the controls environment can be provided as compared with sample testing (e.g. the industry norm). Accuracy and consistency of controls assurance testing perhaps counterintuitively exceeds those of a human through manual testing as the same result will be returned based on the underlying model. Inaccurate results can also be fed back into the model to retrain it, thereby boosting accuracy over time.

Machine learning automation provides for scalability in testing without increasing head count as the model can be trained on different controls by expanding the training model (and corpora) instead of hiring more people to increase testing output.

As an example, 16,000+ tests were performed over 22 mins representing just over 30 seconds to perform three controls from cradle to grave on new CRs with a Suspense Queue rate of 1.2-3.5%.

The control platform 100 applies machine learning to the controls environment. This can impact the flow of action in the controls environment from detective to preventive. This can result in a change the culture. This provides proactive guidance to support staff on draft change records per its likelihood to pass future control tests before the change record is approved. This can streamline the workflow. Integration with Enterprise Change Management systems can prevent change records from being approved based on guidance from the topic model 130. This can help explore other controls. The topic model 130 can work well on free-form text and other 'non-binary tests' enabling the model to expand to other aspects of an Enterprise's Control Framework like problem management, project management, access management, backup and recovery, and so on. Learnings from these models can also be utilized for predictive analytics against historically poor changes to provide indications of Conduct Risk.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A control platform comprising a memory storing instructions to configure a processor to provide:
   a natural language engine having a risk-based corpora;
   a rules engine to receive feature vectors generated from labelled change records and update the risk-based corpora, each of the labelled change records having a label;
   a topic model to generate an expected label for an additional change record, the additional change record being an unlabelled change record, wherein the topic model implements an unsupervised learning process and a supervised learning process to generate the expected label for the additional change record, wherein the unsupervised learning process computes the expected label based on a similarity query by comparing an additional feature vector generated from the additional change record and the feature vectors generated from the labelled change records, and wherein the supervised learning process computing a probabilistic classification for the additional change record by comparing the additional change record to a set of labelled change records, each labelled change record of the set of labelled change records having a label corresponding to the expected label, the topic model trained using the risk-based corpora; and
   a presentation unit to generate an interface for display at an interface application, the interface having visual elements corresponding to the expected label, wherein the interface prompts for verification of the expected label if the probabilistic classification is below a precision threshold.

2. The control platform of claim 1, wherein the topic model implements the supervised learning process to compute a semantic similarity rating between the additional change record and the set of labelled change records and compares the similarity rating to the precision threshold.

3. The control platform of claim 1, wherein the topic model implements the supervised learning process to compute the probabilistic classification using latent semantic analysis.

4. The control platform of claim 3, wherein the topic model computes a confidence score for the expected label and compares the confidence score to the precision threshold, upon determining that the confidence score does not meet the precision threshold, flagging the additional change record for review, and upon determining that the confidence score meets the precision threshold, assigning the expected label to the additional change record.

5. The control platform of claim 4, wherein the topic model receives results of the verification for training.

6. The control platform of claim 1, wherein the natural language engine generates the risk-based corpora by tokenizing and cleansing the labelled change records to generate the feature vectors.

7. The control platform of claim 1, wherein the natural language engine converts the labelled change records to feature vectors using a bag-of-words model to represent each of the labelled change records as a multiset of words that retains multiplicity and disregards grammar and word order.

8. The control platform of claim 1, wherein the natural language engine converts the labelled change records to feature vectors using a term frequency and inverse document frequency real-valued weights model to identify semantic relationships between words of the labelled change records.

9. The control platform of claim 1, wherein the natural language engine converts the labelled change records to feature vectors using latent semantic analysis to extract conceptual concepts from the labelled change records and patterns in semantic relationships between words of the labelled change records, the natural language engine computing topics for semantic similarity queries.

10. The control platform of claim 1, wherein the topic model extracts a topic from the additional change record using one or more vector space models, to discover a semantic structure of text of the additional change record.

11. The control platform of claim 1, wherein the topic model implements a semantic similarity query to compare the additional change record against the labelled change records to determine a similarity score for the additional change record within a similarity threshold.

12. The control platform of claim 1, wherein the topic model determines that the additional change record is an outlier based on the precision threshold and triggers the presentation unit to update the interface with outlier data for the verification, wherein the results of the verification update or train the topic model.

13. The control platform of claim 1, wherein the topic model generates the additional feature vector from the additional change record using a bag-of-words model to represent the additional change record as a multiset of words that retains multiplicity and disregards grammar and word order, converts the multiset of words using a term frequency and inverse document frequency real-valued weights model to identify semantic relationships between features of the additional change record, extracts topics using latent semantic analysis by identifying patterns in the semantic relationships between words of the additional change record.

14. The control platform of claim 1, wherein the similarity query involves computing a similarity score based on a cosine measurement between the additional feature vector and a feature vector of the feature vectors.

15. The control platform of claim 1, wherein the topic model is trained using one or more model parameters such as number of topics, power iterations, extra sampling, similarity threshold, the precision threshold, or a similarity and precision threshold relation.

16. The control platform of claim 1, wherein the topic model is configured to determine a structure of the additional change record using one or more vector space models.

17. The control platform of claim 1, wherein the topic model is configured to use one or more vector space models to extract conceptual content and identify patterns in the additional change record for comparison to the risk based corpora.

18. The control platform of claim 1, wherein the expected label is selected from pass, fail, or suspense.

19. The control platform of claim 1, wherein the natural language engine generates the feature vectors from the labelled change records, by for each of the labelled change records, using a bag-of-words model to represent the respective labelled change record as a multiset of words that retains multiplicity and disregards grammar and word order, converts the multiset of words using a term frequency and inverse document frequency real-valued weights model to identify semantic relationships between features of the respective labelled change record, extracts topics using latent semantic analysis by identifying patterns in the semantic relationships between words of the respective labeled change record.

20. A control process comprising:
   using a natural language engine having a risk-based corpora;
   receiving feature vectors from generated labelled change records and update the risk-based corpora, the feature vectors representing topics from the labelled change records;
   generating an expected label for an additional change record using a topic model that implements an unsupervised learning process and a supervised learning process, the unsupervised learning process based on a similarity query by comparing an additional feature vector generated from the additional change record and the feature vectors generated from the labelled change records, and the supervised learning process computing a probabilistic classification for the additional change record by comparing the additional change record to a set of labelled change records, each labelled change record of the set of labelled change records having a label corresponding to the expected label, the topic model trained using the risk-based corpora; and
   generating an interface for display at an interface application, the interface having visual elements corresponding to the expected label, wherein the interface prompts for verification of the expected label if the probabilistic classification is below a precision threshold.

* * * * *